(12) United States Patent
Yoshiuchi et al.

(10) Patent No.: US 6,326,776 B1
(45) Date of Patent: Dec. 4, 2001

(54) SENSOR DEVICE

(75) Inventors: Shigehiro Yoshiuchi, Osaka; Junichi Yukawa, Nara; Masakazu Hatanaka, Osaka; Toshiya Nakagaki, Wakayama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/424,306

(22) PCT Filed: Mar. 16, 1999

(86) PCT No.: PCT/JP99/01283

§ 371 Date: Feb. 11, 2000

§ 102(e) Date: Feb. 11, 2000

(87) PCT Pub. No.: WO99/49281

PCT Pub. Date: Sep. 30, 1999

(30) Foreign Application Priority Data

Mar. 20, 1998 (JP) ................................. 10-072151

(51) Int. Cl.$^7$ ....................................... G10R 1/04
(52) U.S. Cl. .................. 324/156; 73/866.1; 73/866.5; 439/912; 174/59
(58) Field of Search ............... 324/765, 207.11–207.21, 324/156, 173, 174, 229, 251, 252; 73/866.1, 866.5; 439/620, 953, 954, 912; 174/59, 68, 69

(56) References Cited

U.S. PATENT DOCUMENTS 4,631,976 * 12/1986 Noda et al. ........................ 74/552
5,415,566 * 5/1995 Brunker et al. ................... 439/608

FOREIGN PATENT DOCUMENTS 5-67292 3/1993 (JP).
8-166297 6/1996 (JP).

* cited by examiner

Primary Examiner—Vinh P. Nguyen
Assistant Examiner—Paresh Patel
(74) Attorney, Agent, or Firm—Ratner & Prestia

(57) ABSTRACT

A sensor comprises a detecting element, a circuit board having digital correction function and having connection pads for digital correction for processing a signal of the detecting element, a connector connected electrically to the circuit board for exchanging signals between the circuit board and an external electric system, and holes through which connection pads for digital correction are visible. The holes are provided in the opening of the connector for contacting electrically with a probe for characteristic correction.

25 Claims, 6 Drawing Sheets

SENSOR DEVICE

TECHNICAL FIELD

The present invention relates to sensors used in various controls of an automobile, and more particularly to a sensor for analog output.

BACKGROUND ART

FIGS. 6(a) and 6(b) show a conventional sensor, in which FIG. 6(a) is a front view, and FIG. 6(b) is a sectional view. In FIGS. 6(a) and 6(b), a detecting element 1 for analog output is connected electrically to a circuit board 4 having connection pads 2, 3 for digital correction by means of a cable 5. The circuit board 4 processes the signal of the detecting element 1. The circuit board 4 and the detecting element 1 are accommodated in a case 6. The circuit board 4 is connected to a connector 8 provided in a lid 7 for closing this case 6. This connector 8 can exchange signals with an external electric system as the sensor. The lid 7 has holes 9, 10 through which the connection pads 2, 3 are visible. In the case of digital correction from outside, a probe 11 contacts with the connection pads 2, 3 through the holes 9, 10 to realize digital correction of electric signal. The holes 9, 10 are sealed by a sealing tape 12 after digital correction.

In such conventional constitution, however, to seal the holes 9, 10 provided in the lid 7 in order to prevent invasion of water, an extra member such as the sealing tape 12 is needed, and the number of constituent members is increased, and the number of steps is increased.

SUMMARY OF THE INVENTION

A sensor of the invention has a portion for connecting the probe when correcting the characteristic, in the opening of the connector. Hence, without requiring any additional sealing member, a sensor capable of realizing digital correction can be presented.

BRIEF DESCRIPTION OF THE DRAWINGS

FIG. 4(a) is its sectional view,

BEST MODE FOR CARRYING OUT THE INVENTION

Embodiment 1

Figure 1A:
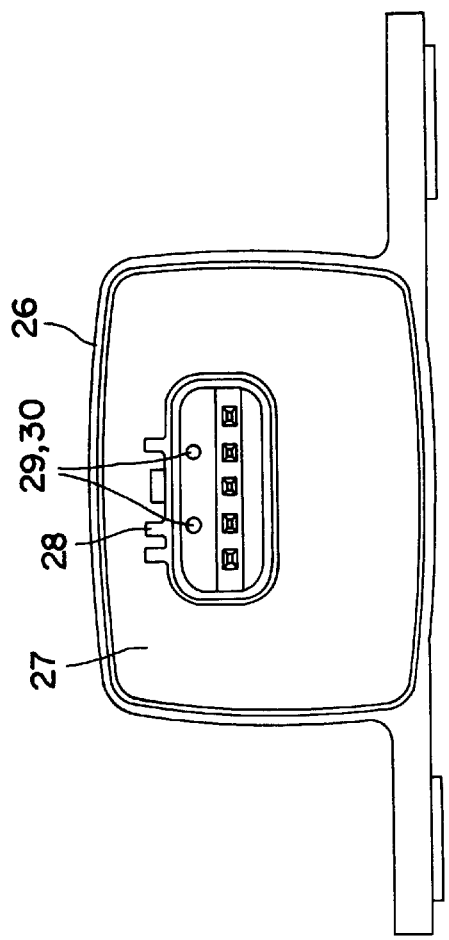
FIG. 1(a) is a front view of a sensor in embodiment 1 of the invention.
Figure 1B:
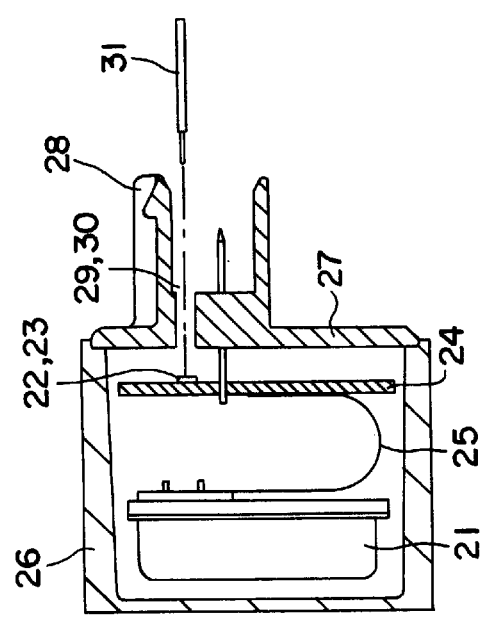
FIG. 1(b) is its sectional view.

FIGS. 1(a) and 1(b) show a sensor in embodiment 1 of the invention, in which FIG. 1(a) is a front view, and FIG. 1(b) is a sectional view. In FIGS. 1(a) and 1(b), a detecting element 21 for analog output is connected electrically to a circuit board 24 having connection pads 22, 23 for digital correction by means of a cable 25. The circuit board 24 processes the signal of the detecting element 21. The circuit board 24 and the detecting element 21 are accommodated in a case 26. The circuit board 24 is connected to a connector 28 provided in a lid 27 for closing this case, and this connector 28 can exchange signals with an external electric system as the sensor. Holes 29, 30 are formed in the opening of the connector 28. In the case of digital correction from outside, a probe 31 contacts with the connection pads 22, 23 through the holes 29, 30 to realize digital correction of electric signal.

In this constitution, it is possible to seal by the connector itself that is fitted to the connector 28. It hence does not require extra member for sealing the holes 29, 30, and the sensor of low cost is obtained.

The digital correction function means a function of correcting the analog output of the detecting element 21 into a specified value. A specific example is given below.

On the circuit board 24, aside from the analog processing circuit of the detecting element 21, there are microcomputer incorporating EEPROM, connection pads 22, 23 for digital correction, and thermistor.

An example of angular velocity sensor is described below. The switch of the microcomputer for digital correction is turned on by a probe 31 through the connection pads 22, 23. In this state, the angular velocity input is fixed at zero, and the ambient temperature is changed. The ambient temperature at this time is measured by the thermistor, and at the same time the crude analog output of the detecting element 21 (that is, the neutral point output) is measured, and these data are A/D converted and stored in the EEPROM.

After this processing, when the angular velocity sensor is put in the actual environment of use, the data being stored in the EEPROM are D/A converted, and by using these values, consequently, the crude analog output date of the detecting elements 21 are added or subtracted to be specified values, so that an optimum correction is realized.

In this embodiment, the digital correction relating to the temperature characteristic data of the neutral point is explained, but not limited to this, digital correction may be applied to various characteristics of the detecting element 21.

The above explanation refers only to embodiment 1, but holds true also in embodiment 2 to 5 as far as the digital correction function is concerned.

Embodiment 2

Figure 2A:
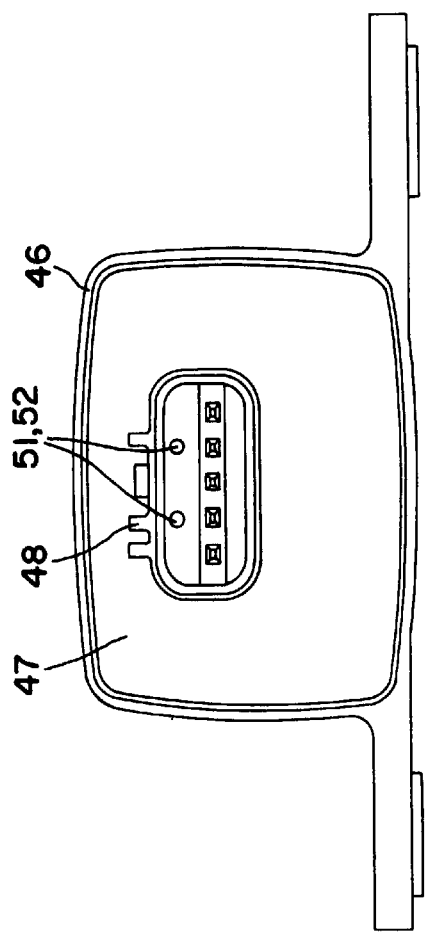
FIG. 2(a) is a front view of a sensor in embodiment 2 of the invention.
Figure 2B:
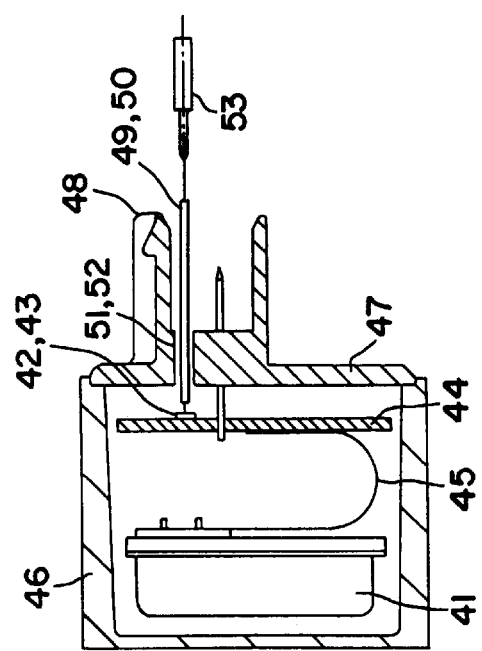
FIG. 2(b) is its sectional view.

FIGS. 2(a) and 2(b) show a sensor in embodiment 2 of the invention, in which FIG. 2(a) is a front view, and FIG. 2(b) is a sectional view. In FIGS. 2(a) and 2(b), a detecting element 41 for analog output is connected electrically to a circuit board 44 having connection pads 42, 43 for digital correction by means of a cable 45, and the circuit board 44 processes the signal of the detecting element 41. The circuit board 44 and the detecting element 41 are accommodated in a case 46. The circuit board 44 is connected to a connector 48 provided in a lid 47 for closing the case 46, and this connector 48 can exchange signals with an external electric system as the sensor. Lead wires 49, 50 are connected to the connection pads 42, 43 for correction of the circuit board 44 at one end each, and, at other end each, drawn out into holes 51, 52 provided in the opening of the connector 48, so that a probe 53 for digital correction contacts electrically with other ends of the lead wires 49, 50.

From such holes 51, 52 through which the connection pads 42, 43 for digital correction are visible provided in the opening of the connector 48, the lead wires 49, 50 connected to the connection pads 42, 43 for correction are drawn out, and the probe 53 for characteristic correction electrically contacts with the other ends, and it hence does not require extra member for sealing the holes 51, 52, and the sensor of low cost is obtained.

Embodiment 3

Figure 3A:
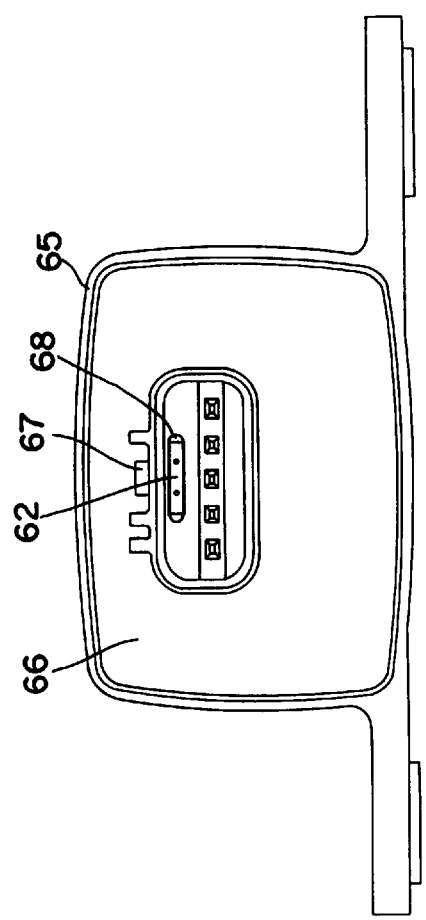
FIG. 3(a) is a front view of a sensor in embodiment 3 of the invention.
Figure 3B:
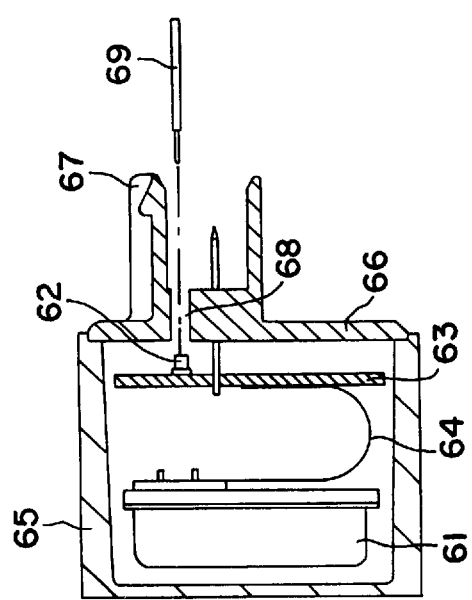
FIG. 3(b) is its sectional view.

FIGS. 3(*a*) and 3(*b*) show a sensor in embodiment 3 of the invention, in which FIG. 3(*a*) is a front view, and FIG. 3(*b*) is a sectional view. In FIGS. 3(*a*) and 3(*b*), a detecting element 61 for analog output is connected electrically to a circuit board 63 having a micro-connector 62 for digital correction by means of a cable 64, and the circuit board 63 processes the signal of the detecting element 61. The circuit board 63 and the detecting element 61 are accommodated in a case 65, and the circuit board 63 is connected to a connector 67 provided in a lid 66 for closing the case 65, and this connector 67 can exchange signals with an external electric system as the sensor. A hole 68 through which the micro-connector 62 for digital correction is visible is formed in the opening of the connector 67, so that a probe 69 for characteristic correction contacts electrically with the circuit board 63.

Since the hole 68 is provided in the opening of the connector for observing the micro-connector 62 for digital correction with which the probe 69 contacts electrically at the time of characteristic correction, it does not require extra member for sealing the hole, and the sensor of low cost is obtained.

Embodiment 4

Figure 4A:
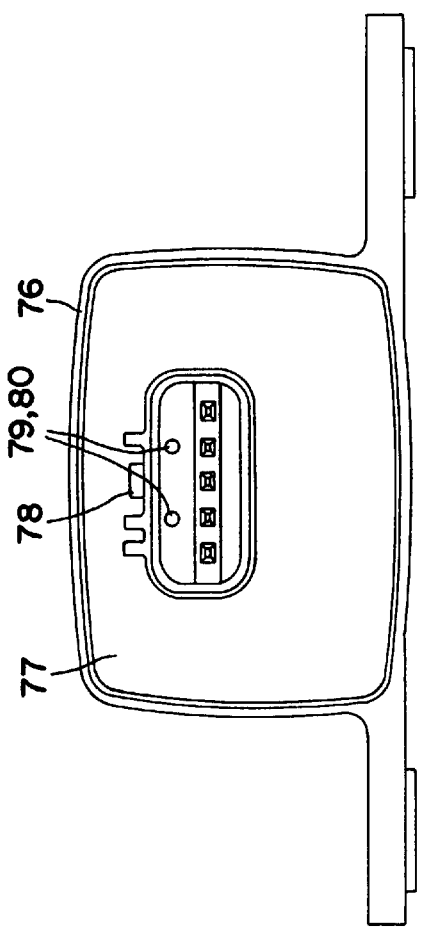
FIG. 4(a) is a front view of a sensor in embodiment 4 of the invention.
Figure 4B:
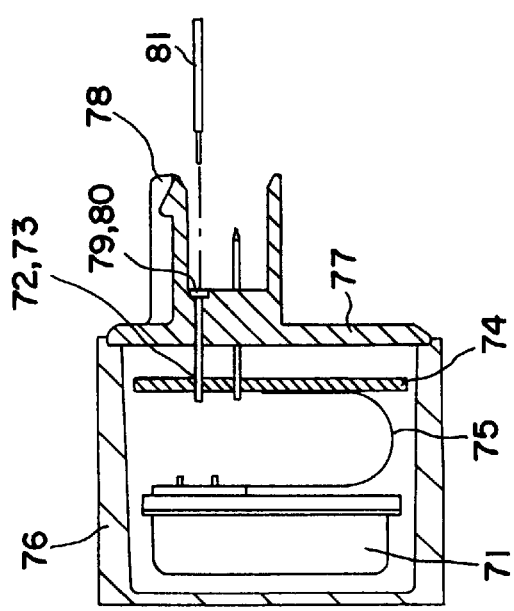

FIGS. 4(*a*) and 4(*b*) show a sensor in embodiment 4 of the invention, in which FIG. 4(*a*) is a front view, and FIG. 4(*b*) is a sectional view. In FIGS. 4(*a*) and 4(*b*), a detecting element 71 for analog output is connected electrically to a circuit board 74 having junctions 72, 73 for digital correction by means of a cable 75, and the circuit board 74 processes the signal of the detecting element 71. The circuit board 74 and the detecting element 71 are accommodated in a case 76. The circuit board 74 is connected to a connector 78 provided in a lid 77 for closing the case 76, and this connector 78 can exchange signals with an external electric system as the sensor. In the bottom of the opening of the connector 78, terminals 79, 80 for digital correction connected to the junctions 72, 73 for digital correction are exposed, and a probe 81 for characteristic correct ion contacts electrically with the terminals 79, 80 for digital correction.

In this constitution, it does not require extra member for sealing the terminals 79, 80 for digital correction, and the sensor of low cost is obtained.

Embodiment 5

Figure 5A:
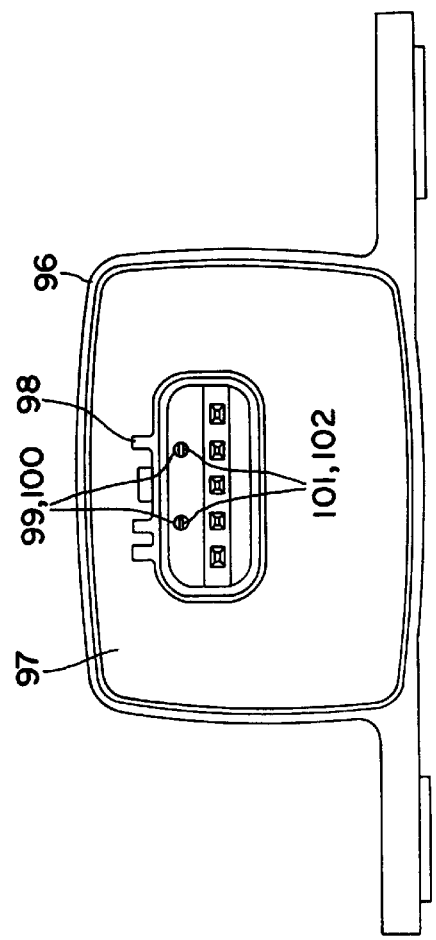
FIG. 5(a) is a front view of a sensor in embodiment 5 of the invention.
Figure 5B:
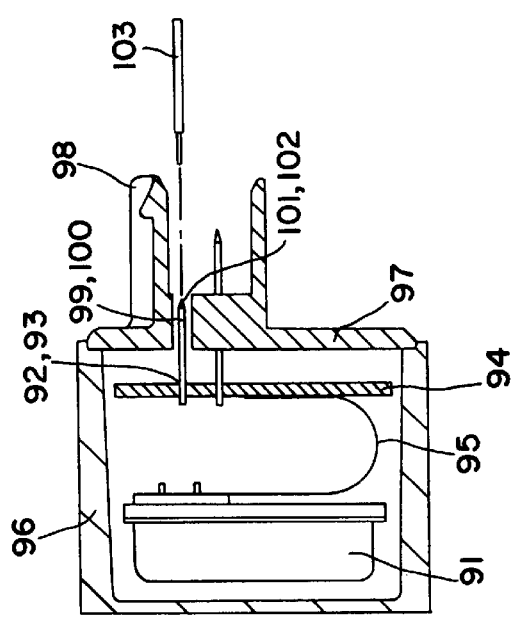
FIG. 5(b) is its sectional view.
Figure 6A:
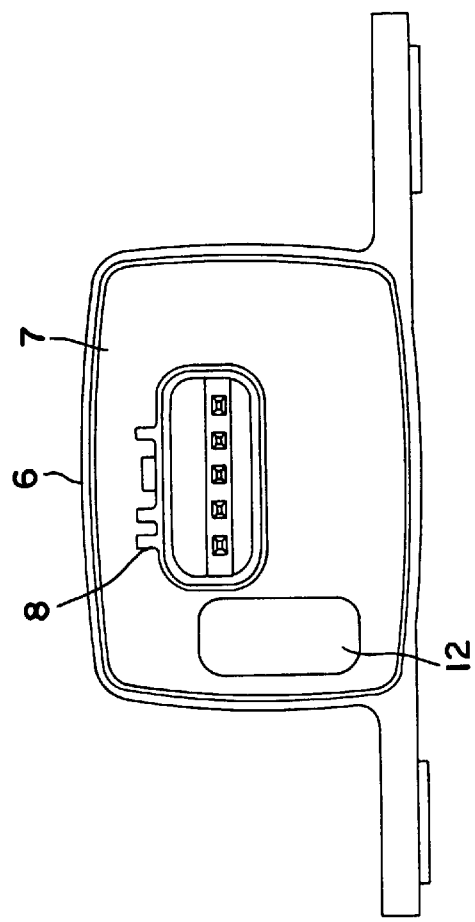
FIG. 6(a) is a front view of a sensor in a prior art.
Figure 6B:
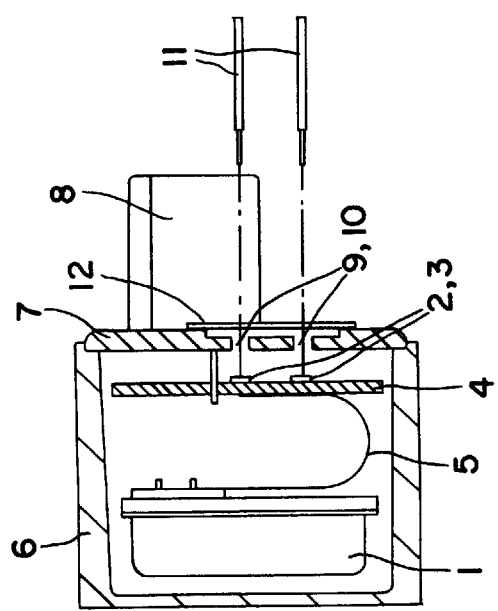
FIG. 6(b) is its sectional view.

FIGS. 5(*a*) and 5(*b*) show a sensor in embodiment 5 of the invention, in which FIG. 5(*a*) is a front view, and FIG. 5(*b*) is a sectional view. In FIGS. 5(*a*) and 5(*b*), a detecting element 91 for analog output is connected electrically to a circuit board 94 having junctions 92, 93 for digital correction by means of a cable 95, and the circuit board 94 processes the signal of the detecting element 91. The circuit board 94 and the detecting element 91 are accommodated in a case 96, and the circuit board 94 is connected to a connector 98 provided in a lid 97 for closing the case 96, and this connector 98 can exchange signals with an external electric system as the sensor. Lead terminals 99, 100 connected electrically to the junctions 92, 93 of the circuit board 94 are extended into the releasing portions of holes 101, 102 provided in the opening of the connector 98, and these lead terminals 99, 100 are placed so that a probe 103 for characteristic correction may electrically contact with the extended portions of the lead terminals 99, 100.

In this constitution, it does not require extra member for sealing the holes 101, 102, and the sensor of low cost is obtained.

INDUSTRIAL APPLICABILITY

As described herein, the invention realizes a sensor for digital correction at low cost, without requiring extra member for sealing holes for digital correction.

What is claimed is:

1. A sensor comprising:
   a detecting element,
   a circuit board having digital correction function and having a connection pad for digital correction of a signal from said detecting element,
   a connector connected electrically to said circuit board, said connector adapted for transmitting a signal between said circuit board and an external electric system, and
   said connector having an opening with a hole disposed therein, so that said connection pad for digital correction is visible through said hole, and a probe for characteristic correction is capable of electrically contacting said connection pad through said hole.

2. The sensor of claim 1,
   wherein an end of a lead wire is connected to said connection pad for correction of said circuit board,
   other end of said lead wire is drawn out from said hole formed in the opening of said connector, and
   said probe for digital correction may be connected to said other end of said lead wire.

3. The sensor of claim 1,
   wherein a micro-header is used instead of the connection pad provided in said circuit board.

4. The sensor of claim 1, wherein said connector is a water-proof connector.

5. A sensor of claim 1, wherein said connector is a shielded connector.

6. The sensor of claim 1, wherein said digital correction function has a function for correcting an analog output of said detecting element into a specified value by microcomputer.

7. A sensor comprising:
   a detecting element,
   a circuit board having digital correction function and having a junction for digital correction for processing a signal from said detecting element,
   a connector connected electrically to said circuit board, said connector exchanging a signal between said circuit board and an external electric system,
   a terminal exposed through an opening of said connector and connected electrically to said junction for digital correction.

8. The sensor of claim 7, wherein said connector is a water-proof connector.

9. The sensor of claim 7, wherein said connector is a shielding connector.

10. A sensor comprising:

a detecting element, a circuit board having digital correction function and having a connection pad for digital correction for processing a signal from said detecting element, a connector connected electrically to said circuit board, said connector exchanging a signal between said circuit board and an external electric system, said connector having an opening, and a lead terminal connected electrically to the connection pad of said circuit board, wherein said lead terminal is visible through a hole formed in said opening of said connector so that a probe for characteristic correction is capable of electrically contacting said lead terminal.

11. The sensor of claim 10, wherein said connector is a water-proof connector.

12. The sensor of claim 10, wherein said connector is a shielding connector.

13. A sensor comprising:

a case, a detecting element in said case, a circuit board in said case, said circuit board having a terminal and a digital correction function, and a connector disposed on said case, said connector including an opening, and said connector being connected electrically to said circuit board, wherein said opening and said terminal are positioned so that a probe for characteristic correction is capable of contacting said terminal through said opening in said connector.

14. The sensor of claim 13, wherein said sensor has a function of analog output.

15. The sensor of claim 13, further comprising a lid placed in a second opening of said case, wherein said connector is placed in said lid.

16. The sensor of claim 13, wherein said connector is formed so that said opening of said connector may be sealed by a device when said connector is connected to said device.

17. The sensor of claim 13, wherein said opening extends through said connector.

18. The sensor of claim 13, wherein said connector has a hole formed in said opening, said terminal is a connection pad placed on said circuit board, and said hole and said connection pad are positioned so that said probe can observe said connection pad through said hole.

19. The sensor of claim 13, wherein said connector has a hole formed in said opening, said circuit board has a connection pad, said terminal is connected said connection pad at one end, other end of said terminal passes through said hole, and projects at least one position of in said opening and outside of said connector, and said other end of said terminal is positioned so that said probe may contact with said other end.

20. The sensor of claim 13, wherein said connector has a hole formed in said opening, said terminal is a micro-connector placed on said circuit board, and said hole and said micro-connector are positioned so that said probe can observe said micro-connector through said hole.

21. The sensor of claim 13, wherein said terminal has one end aligned with said opening of said connector, and said one end of said terminal is placed so that said probe may contact said one end of said terminal.

22. The sensor of claim 13, wherein said connector has a hole formed in said opening, said circuit board includes a connection pad, said terminal is connected to said connection pad at one end, other end of said terminal projects into said hole, and said other end of said terminal is positioned so that said probe may contact with said other end.

23. The sensor of claim 13, wherein said connector has a water-proof function.

24. The sensor of claim 13, wherein said connector has a shielding function.

25. The sensor of claim 13, wherein said digital correction function has a function for correcting an analog output of said detecting element into a specified value.

* * * * *